Aug. 30, 1966   J. A. GILLOTTI   3,269,455
VEHICLE INSECT SCREEN
Filed Oct. 28, 1963
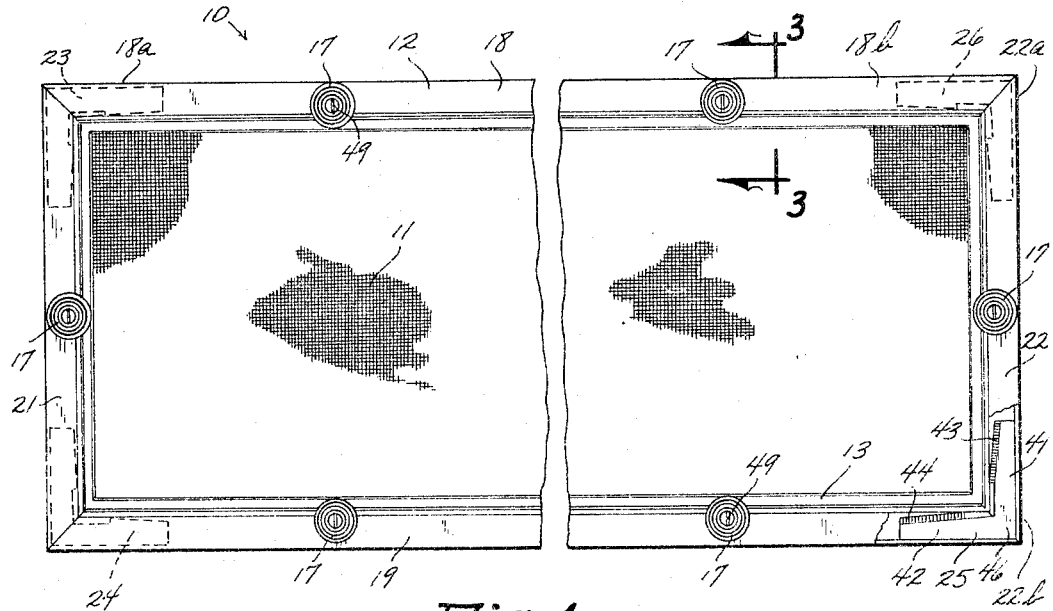
Fig. 1
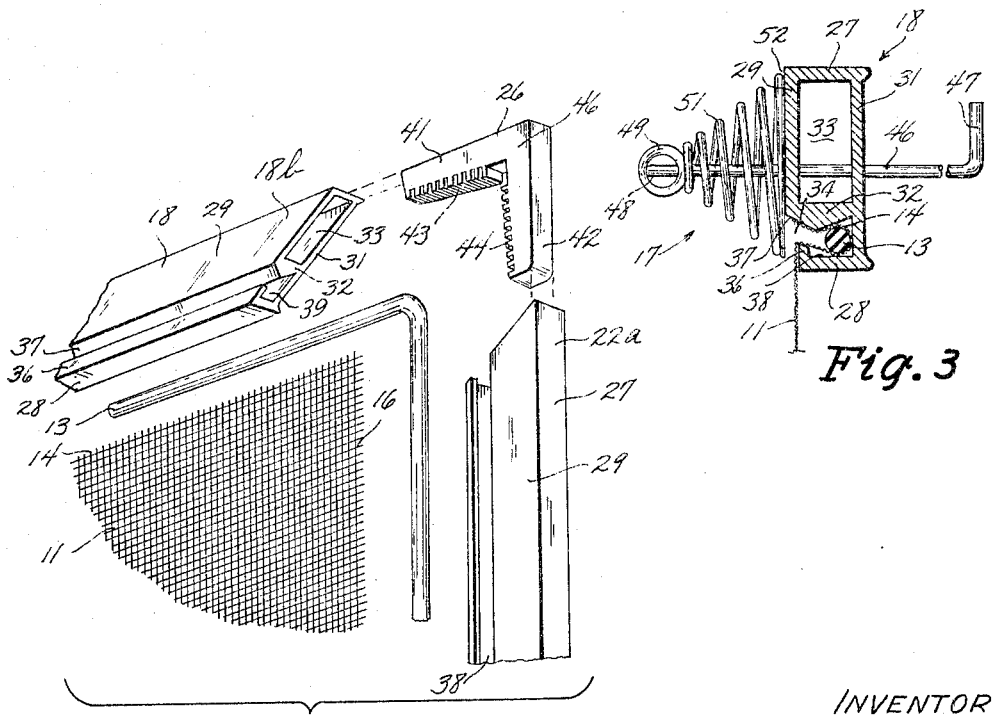
Fig. 2
Fig. 3
INVENTOR
JOSEPH A. GILLOTTI
BY
N. Robert Henderson
ATTORNEY United States Patent Office 3,269,455
Patented August 30, 1966

3,269,455
VEHICLE INSECT SCREEN
Joseph A. Gillotti, 1964 Indianola Road,
Des Moines, Iowa
Filed Oct. 28, 1963, Ser. No. 319,205
1 Claim. (Cl. 160—369)

This invention relates to a screen device for preventing the passage therethrough of bugs and other small insects, and pertains particularly to a lightweight but durable screen for use with automotive vehicles.

It is a primary object of this invention to provide an improved insect screen for particular use with vehicles and the like.

It is another object of this invention provide an insect screen which is readily assembled to the front end of a vehicle, and which can be manufactured of any dimension and contour with but minor manufacturing adjustments.

Yet another object of this invention is to provide a vehicle insect screen which is of few parts, and which is rugged in use with all types of vehicles and in all types of weather.

Still another object of this invention is the provision of a vehicle insect screen wherein side, top, bottom and frames are manufactured of extruded aluminum and are securely locked together at their corners by nylon corner braces having an improved configuration.

It is another object of this invention to provide an improved vehicle insect screen which is simple to manufacture, easily serviced, and effective in use.

These objects and other features and advantages of this invention will become readily apparent upon reference to the following description and the accompanying drawings, wherein:

FIG. 1 is a foreshortened rear elevational view of a preferred embodiment of the vehicle bug screen assembly of this invention;

FIG. 2 is an enlarged, fragmentary exploded view of one of the four corners of the screen assembly; and FIG. 3 is an enlarged cross-sectional view taken along the line 3—3 in FIG. 1.

Referring now to the drawings, an insect screen assembly is illustrated generally at 10 in FIG. 1 in a preferred embodiment. The insect screen assembly 10 comprises generally a mesh screen 11 held in a rectangular frame 12 by means of a flexible spline 13 (FIGS. 2 and 3). The spline 13 is fitted into the frame 12 in a manner detailed hereinafter, described to hold the edges 14 and 16 (FIG. 2) of the screen 11, whereby the screen is held taut for optimum effectiveness. A plurality of yieldable retainer clips 17 (FIGS. 1 and 3) are affixed to the frame 12 for attaching the frame 12 to the front of an automobile (not shown).

Specifically, the screen 11 is cut in a rectangular pattern, with straight side edges 14 longer than straight end edges 16 (FIG. 2). The frame 12 includes a pair of side frames 21 and 22, and a quartet of corner braces 23, 24, 25, and 26. Both side frames are identical in configuration and length, as are both end frames identical in configuration and length. The only difference between the side frames 18 and 19, and the end frames 21 and 22 is length, the former being longer than the latter.

With all side frames and end frames being identical except as to length, only one frame, side frame 18 specifically, will be described, with like reference numerals applying to like parts for all frames. The frame 18 is of extruded aluminum, and can be of any length or contour to fit the requirement of the particular vehicle, a factor which applies to all other elements of the screen assembly 10. As best shown in FIGS. 2 and 3, the frame 18 is generally rectangular in shape, having outer and inner end members 27 and 28, respectively, and front and rear side members 29 and 31, respectively.

It will be noted that an intermediate partition 32 extends between the side members 29 and 31, enclosing a chamber 33 which extends the entire length of the frame 18, and provides a hollow portion 18a and 18b at each end for a purpose described hereinafter. It is noted further that the side member 29 and end member 28 do not meet, both being shortened whereby a gap 34 is formed therebetween. A lip 36 is formed on the end member 28 which extends toward the partition 32 and narrows the gap 34.

The face 37 of the partition 32 extends toward the opposite face 38 of the end members 28 to form a throat of a predetermined width, and then diverges therefrom to form a groove 39 which extends the full length of the frame.

Referring particularly to FIG. 3, it can readily be seen that after placing an edge of the screen into the groove 39, the screen is securely attached to the frame 18 by inserting the spline 13 therein. Furthermore, as the diameter of the spline 13 is greater than the throat, the spline having been squeezed through the throat, it will remain locked within the groove 39. By this arrangement, the screen 11 can be held taut between the frames for most effectively preventing the passage of bugs therethrough.

To secure adjacent ends of the side frames 18 and 19 to adjacent ends of the end frames 21 and 22 is the purpose of the identical corner braces. Each brace, 26 (FIG. 2) for example, comprises a pair of legs 41 and 42, the adjacent faces of which have serrations 43 and 44 formed thereon, respectively. To ensure that upon insertion of each leg 41 and 42 into a hollow end portion 18b and 22b, respectively, a progressively increased grip will be attained, each leg has an increasingly greater width from the outer end thereof toward the junction 46 of the legs. With each brace manufactured of a material such as nylon, a rugged securement of the corners of the frame is provided.

To attach the frame 12 to the front of any automotive vehicle, the retainer clips 17 are provided. Depending entirely on what vehicle is being serviced—so to speak— the clips are adaptable for placement on any of the frames and in any desired grouping. Each clip 17 comprises a stem 46 (FIG. 3) reciprocally inserted through a pair of aligned openings (not shown) formed therefor in the side members 29 and 31 of a frame. One end 47 of the stem 46 is bent at substantially right angles to the remainder of the stem, and the other end 48 serves as a basis for the attachment to the stem 46 of one end 49 of a conical, spiral spring 51.

The spring 51 is mounted between the stem end 48 and the face 52 of the front side member 29. Thus, by grasping the exposed end 49 of the spring 51, and by having the stem 46 and the spring 51 rotatable, the stem inner end 47 can be inserted behind any part of a vehicle's grill so as to anchor the particular retainer clip 17. In this manner, all clips 17 can be easily manually manipulated to attach the insect screen assembly 10 in place.

In summation, a vehicle insect screen assembly of a lightweight, rugged and extremely simple design is provided, and which can be of any dimension and contour to adapt to the requirements of the vehicle, plus having readily yieldable and variably placed retaining devices for releasably attaching the assembly to a vehicle.

Although a preferred embodiment has been described and disclosed hereinbefore, this invention is not intended to be limited thereto and thereby, the true scope and spirit of the invention being set forth in the appended claim.

I claim:

A bug screen assembly adapted for attachment to the front of a vehicle comprising in combination:
  a screen adapted to be held taut;
  a pair of side frames each having a hollow portion at each end, and each having a longitudinal groove formed therein;
  a pair of end frames each having a hollow portion at each ned, and each having a longitudinal groove formed therein;
  a plurality of right angular braces each of which is inserted into a side frame hollow portion and an end frame hollow portion adjacent thereto for holding said respective side and end frames together, each right angular brace comprising a pair of solid, substantially rigid legs the outer faces of which extend from an outer apex at right angles from each other, and which outer faces the full length of which are smooth for frictional engagement with the inner surfaces of the outer walls of the side and end frames within said hollow portions, the inner faces of said legs of which extend from an inner apex at right angles from each other and having an inner portion and an outer portion, said inner portion extended parallel to a respective outer face, each outer portion having a face progressively converging relative to a respective outer face toward an end of said leg, and a row of teeth formed on each outer portion, said teeth of identical depth the direction of which extends at right angles to the plane of a respective outer face, said teeth frictionally engaging the inner surfaces of the inner walls of the side and end frames within said hollow portions;
  said screen having edges extended into said side frame and end frame grooves;
  a spline inserted into said side frame and end frame grooves for holding said screen edges therein whereby said screen is held taut; and
  yieldable means secured to said frame members for releasable attachment to the front of a vehicle, said yieldable means including an elongated retaining clip reciprocally inserted through a frame member and with the inserted end thereof bent at an angle to the remainder, and including further a spring secured between the end opposite to the inserted end and the respective frame member, and with the outer end of said spring formed for finger manipulation for rotating both spring and clip simultaneously.

References Cited by the Examiner

UNITED STATES PATENTS

| | | | |
|---|---|---|---|
| 2,067,639 | 1/1937 | Lett | 160—371 X |
| 2,720,260 | 10/1955 | Plucinski | 160—369 X |
| 2,868,308 | 1/1959 | Biewald | 180—68 |
| 2,989,788 | 6/1961 | Kessler | 160—381 X |
| 2,996,159 | 8/1961 | Casebolt | 189—36 |
| 3,083,797 | 4/1963 | Wergin | 189—36 |

HARRISON R. MOSELEY, *Primary Examiner.*

P. C. KANNAN, *Assistant Examiner.*